Sept. 15, 1959 R. WUCHER 2,903,747
APPARATUS FOR MOULDING PLASTIC MATERIALS
Filed June 22, 1956 2 Sheets-Sheet 1

Inventor
R. Wucher
By Glascock Downing & Seebold
Attys.

United States Patent Office 2,903,747
Patented Sept. 15, 1959

2,903,747

APPARATUS FOR MOULDING PLASTIC MATERIALS

Roland Wucher, St. Ouen, France

Application June 22, 1956, Serial No. 593,187

Claims priority, application France June 24, 1955

3 Claims. (Cl. 18—30)

This invention relates to apparatus for moulding synthetic resins of all descriptions and natural and synthetic rubbers or other non-metallic mouldable materials or compositions. It is one of the objects of the invention to provide improved apparatus for injection moulding of such materials which is of relatively simple and inexpensive construction whilst affording rapid and economical production of moulded articles.

Apparatus for injection moulding according to the invention comprises a heated cylinder, a screw or worm rotatable within the cylinder for feeding and plasticizing material supplied thereto, valve means in the end of the cylinder towards which the material can be fed said valve means being adapted to be opened by engagement with a mould to permit injection of material therein, a rotatable plate or table adapted to carry two or more moulds for sucessive presentation to the cylinder valve means and means for effecting relative displacement between the rotatable plate or table and the cylinder for actuating the said valve means to effect injection of material into the mould.

According to a further feature of the invention there is mounted on the screw or worm, preferably at the forward end thereof, a diffuser head affording narrow channels or passages through which the material is caused to pass.

In one arrangement according to the invention, injection is effected by relative movement between the screw or worm and the cylinder. In another arrangement the screw or worm is fixed relatively to the cylinder longitudinally, and injection is effected by screw action.

Other features of the invention will be clear from the following description and claims.

In the accompanying drawings.

Figure 1:
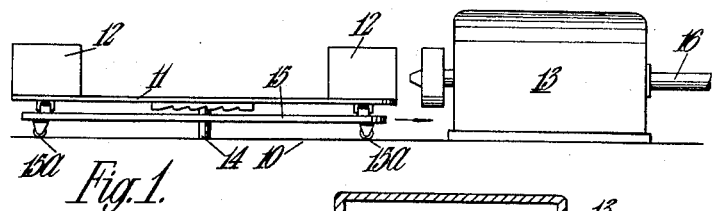
Figure 1 is a side elevation, more or less diagrammatic, of an apparatus or machine for moulding plastic materials, arranged and constructed in accordance with the invention.
Figure 2:
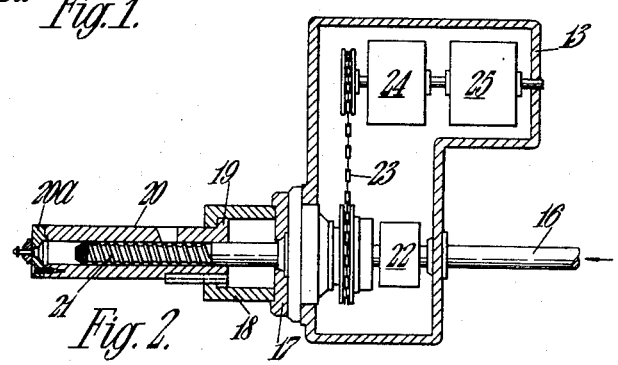
Figure 2 is a side elevation in section of the injection head of the machine of Figure 1.
Figure 3:
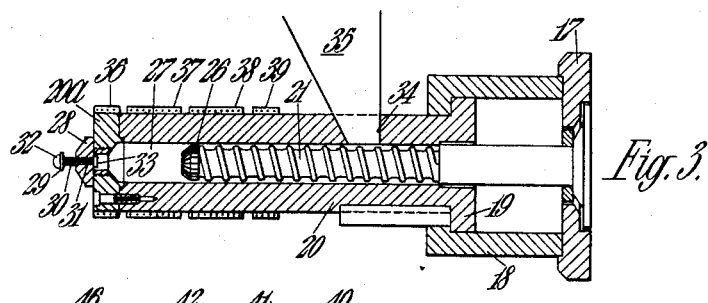
Figure 3 is a side elevation in section of a part of the injection head of Figure 2 to an enlarged scale.

In carrying the invention into effect according to one convenient mode as illustrated in Figures 1, 2 and 3, there is provided an injection moulding machine comprising a frame 10 on which is mounted a table 11 carrying a series of moulds 12. The table is rotatable about a shaft 14 and is carried by a support 15 slidable as e.g. on rollers 15a on the frame 10 and displaceable thereon by means of suitable mechanism (not shown). An injection head 13 is also displaceably mounted on the frame 10 and is adapted to be actuated by hydraulically or mechanically operated piston or pusher means 16. In order to carry out a moulding operation, the table support 15 is displaced so as to bring a mould 12 into engagement with the injection head 13, after which the plastic material is injected into the mould by displacing the piston or pusher means 16. When the moulding operation is complete the piston means 16 is returned rearwardly and the table support 15 is returned to its initial position to permit a fresh mould 12 to be aligned with the injection head 13 by rotating the table 11, the above operations being then repeated.

Referring to Figures 2 and 3, the injection head 13 comprises a support 17 displaceably mounted on the frame 10 and subject to the action of the piston or pusher means 16. The support 17 also comprises a casing 18 within which is mounted a flanged end 19 of a cylinder 20 adapted to slide within the casing 18. A screw or worm 21 is mounted for rotation within the cylinder but is fixed in regard to longitudinal movement to the support 17. The screw 21 is rotationally driven through clutch means 22, a chain or other transmission 23, and a variable speed gear 24 from a motor 25. A diffuser head 26 affording a series of narrow channels or passages is secured to the outer end of the screw 21 and fits closely within the cylinder 20. A chamber 27 is afforded between the diffuser head 26 and the outer end of the cylinder 20. An end plate 20a of the cylinder has a central aperture closed by a plug 28 which carries a valve 29. The latter comprises a sleeve 30, the interior of which communicates with lateral ports 31. The sleeve 30 also carries a nozzle 32 having a central bore and shaped for according a connection with the inlet orifice of the mould. The oposite end of the sleeve 30 carries a closure disc 33. The length of the valve constituted by the sleeve 30 exceeds the longitudinal thickness of the plug 28 and the valve is adapted to slide in the plug so that in its outer position the outlet from the chamber 27 is closed and in its inner position it is possible for plastic material to flow out through the ports 31 and the sleeve bore when the nozzle 32 engages the plug 28. An opening 34 in the side of the cylinder 20 permits feeding thereto of raw material from a hopper 35. The cylinder is provided with cylindrical heaters indicated at 36, 37, 38 and 39, preferably of the electrical resistance type.

In carrying out a moulding operation the motor 25 is started up and the clutch 22 is engaged to drive the screw 21. The latter may be rotated for example, at a speed of 100 to 300 revolutions per minute and has a length which preferably corresponds to about eight times its diameter. The raw material, which may be in powdered, granulated, cubed, puttied or other suitable condition, is introduced into the hopper 35 and enters the space between the cylinder 20 and the screw 21. The material is carried along by the screw and is thereby stirred and plasticized between the screw and the cylinder wall as it travels towards the diffuser head 26. Over the latter part of its path of travel, the material is heated by the action of the heaters. The material is forced through the narrow passages of the diffuser head 26 and enters the chamber 27. As the latter fills, the pressure of material therein displaces the cylinder 20 to its extreme left hand position as seen in Figure 3, the flange 19 then bearing against the left hand wall of the casing 18. In this position the valve nozzle 32 is engaged with the orifice of the mould 12 and is displaced towards the right as seen in the figures so that the valve opening is placed in communication with the chamber 27 through the ports 31. At this time the screw 21 is disconnected from the drive by suitable mechanism disengaging the clutch 22 and the piston or pusher means 16 is displaced towards the left, thereby displacing the injection head 13 towards the left. Since the cylinder 20 remains stationary after its engagement with the mould the screw 21 and the casing 18 are displaced to the left causing the plasticized material in the chamber 27 to be compressed and forced into the mould, the valve being displaced into the cylinder whilst the diffuser head approaches the end of the latter. The diffuser head thus acts as a piston to inject the plasticized material into the mould. When the required amount of material has been injected into the mould a reverse movement is initiated by suitable automatic mechanism causing the piston or pusher means 16 to return towards the right and entrain the casing 18 and the screw 21, the cylinder 20 remaining stationary, until the flange 19 engages with the front wall of the casing 18. Further movement of the piston means 16 then effects the withdrawal of the cylinder 20. During these movements the diffuser head 26 is withdrawn into the cylinder 20 leaving the chamber 27 free for the reception of a fresh quantity of fluid or plasticized material, the valve 29 being then closed. The cycle of operations for a further mould injection is then recommenced.

Figure 4:
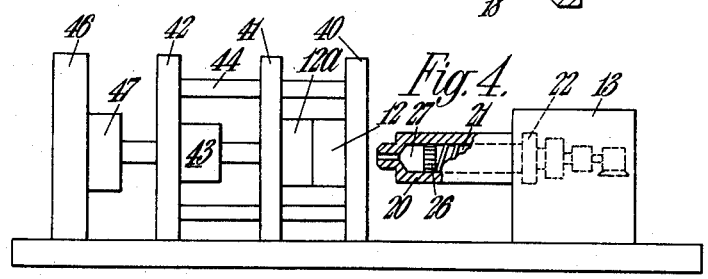
Figure 4 is a side elevation partly in section of another form of moulding apparatus in accordance with the invention.
Figure 5:
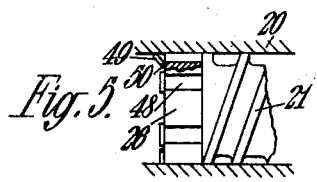
Figure 5 is a side elevation, partly in section, of a diffuser head.
Figure 6:
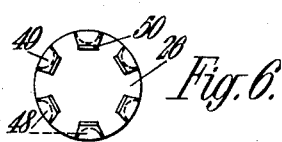
Figure 6 is a front view of the diffuser head.

In another mode of carrying the invention into effect as illustrated in Figures 4, 5 and 6, an injection head 13 is provided which may be similar to that previously described except that it is fixed in relation to the frame 10. A mould shown at 12, 12a, is displaceably mounted on the frame 10. The mould comprising two parts 12 and 12a is mounted on two plates or supports 40 and 41. A plate 42 carries a jack or ram 43 for closing the mould. The assembly of plates is mounted on slide bars 44 and 45 and is displaceable on the frame 10. A bearer plate 46 is fixed to the frame 10 and carries an injection jack or ram 47. The mould parts 12 and 12a are located on the plates or supports 40 and 41 and can be closed together by operation of the jack or ram 43, whereby the plates or supports 40, 41, become in effect an integral unit. This assembly or unit is displaced upon the frame 10 by operation of the jack or ram 47, whereby the assembly and the mould are moved to engage the injection head 13.

The injection head 13 is generally of similar construction to the injection head previously described and has a screw or worm 21 which is fixed longitudinally and a cylinder 20 capable of longitudinal displacement relatively to the screw. If desired, however, the arrangement may be modified so that the cylinder is fixed and the screw is given a longitudinal translational movement simultaneously with its rotation.

The driving means for the screw 21 includes a clutch 22 which is also adapted to act as a safety device for torque limitation, and may also include reversing means of any desired type, operated by mechanical, electrical, or other means.

A diffuser head 26 is mounted on the forward end of the screw 21 and may be as described in the previous example. Alternatively however, the diffuser head may be provided with non-return valve means as illustrated in Figures 5 and 6. The diffuser head comprises a cylindrical block 26 fitting closely in the cylinder 20 and having narrow channels or passages 48 formed in its periphery. A valve or blade 49 is located in front of each passage and is pivotally mounted at 50 so as to act in the manner of a flap valve. When the plastic material is compressed for injection into the mould the valve members open about their pivots to allow the material to be forced through the passages 48. If there is an excessive pressure in the compression chamber 27 the valves will close over the channels or passages and prevent reverse flow of the material. Other forms of non-return valve means may be provided as described in my co-pending patent application, Serial No. 593,282, relating to apparatus for moulding plastic materials.

Figure 7:
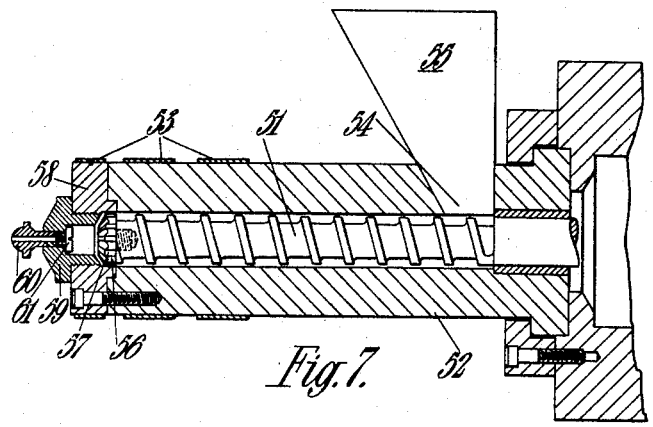
Figure 7 is a longitudinal sectional view of a modified form of injection head.

In carrying the invention into effect according to another mode, the injection head cylinder described in the previous examples is modified as illustrated in Figure 7. A feeding and plasticizing screw or worm 51 is rotatably mounted within an injection cylinder 52 which is provided with heating means 53 located preferably near its forward end. Any suitable means (not shown) are provided for driving the screw or worm which is mounted so that it does not move longitudinally relative to the cylinder. Material is fed to the space between the screw and the cylinder through an aperture 54, located towards the rear of the latter, from a hopper 55. A diffuser head 56 is mounted on the forward end of the screw and is provided with narrow channels 57 in the periphery thereof. These channels may be of any desired form. The forward end of the cylinder is closed by a cover 58 in which is secured a plug 59 having a central bore in which is slidable a valve having a nozzle 60 and a closure disc 61. Pressure of material fed forwardly by the screw 51 maintains the valve closed as shown in Figure 7. By bringing a mould into engagement with the nozzle 60 as later described, the valve is moved inwardly so that material can be injected into the mould. The screw 51 is preferably of course pitch and is rotated at a high speed so that the fluid or highly plasticized material is fed towards the valve at a relatively low pressure. The screw can be driven by any suitable means, but the drive preferably includes a clutch which is also adapted to limit the torque, and drive reversal means. The arrangement is such that the drive can be stopped or reversed at any time.

Figure 8:
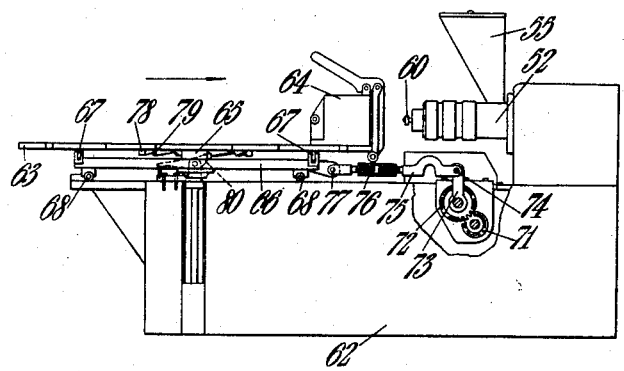
Figure 8 is a side elevation of an injection moulding apparatus in accordance with the invention showing mechanism for actuating the mould table.
Figure 9:
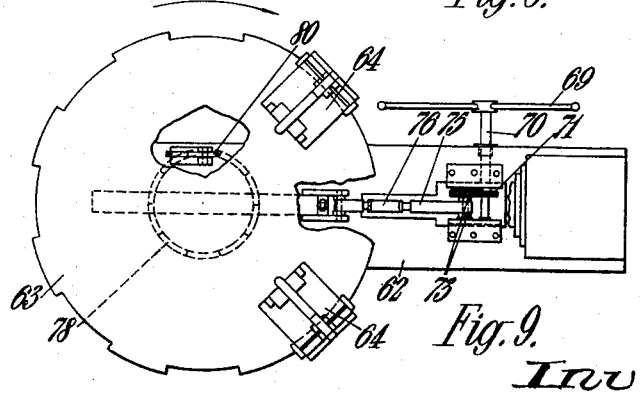
Figure 9 is a plan view of Figure 8.

Referring to Figures 8 and 9, the injection head is carried by a frame 62 which also carries a table 63 which supports two or more moulds or mould carriers indicated at 64. These moulds may be of any convenient kind and may include core elements. The table 63 is of generally circular shape and is rotatable about a central bearing 65 on a displaceable carriage 66, the table being supported from the latter by rollers 67. The carriage 66 is displaceable towards and away from the injection head upon rollers 68, suitable longitudinal guide means being produced if required. Displacement and rotation of the table 63 is effected by a hand lever 69 (Figure 9) on a shaft 70 which drives through gear 71 a larger gear 72 carrying a pair of arms 73 having a cross pin 74 and constituting a crank. A link 75 including an adjustable turnbuckle 76 connects the pin 74 with a pin 77 mounted on the carriage 66. A circular rack 78 is secured to the underside of the table 63 and has a suitable number of teeth 79 to correspond with the number of moulds or mould carriers. A spring loaded catch 80 is pivotally mounted on the frame 62 in a position to engage the rack teeth. Operation of the hand lever 69 in one direction operates the crank arms 73 to pull the carriage 66 and table 63 towards the injection head and locks it in position with the injection orifice of the mould in engagement with the valve nozzle 60 to open the latter, so that material flows into the mould under low pressure applied by the screw 51. During this movement of the table the rack 78 is moved away from the catch 80 a sufficient distance to permit the latter to drop into the next tooth space. Upon completion of the injection moulding operation the handle lever 69 is rotated in the opposite direction to return the carriage 66 and table to their initial position. Since the catch 80 has previously been engaged with the next rack tooth, this return movement causes the table to rotate about its axis through an angle to bring the next mould into alignment with the injection head. In order to ensure correct alignment, a spring loaded plunger (not shown) may be included in the arrangement for ensuring exact angular positioning of the table.

Once the speed of rotation of the feed screw 51 has been set, this can generally remain constant for each of a series of injection operations, so that the time of mould filling will depend upon the volume of the moulded article. As soon as a mould has been filled the drive of the feeding screw is interrupted and the mould table is withdrawn, so that the valve in the injection head closes under residual pressure and prevents undesired issuance of material between successive injections. Each filled mould is opened at a convenient time and the cooled moulded article is removed, after which the mould is again closed. Thus the production of moulded articles can proceed at a fast rate. Since relatively low pressures are employed, many parts of the apparatus can be formed from light metal or alloy. It will be appreciated that the invention provides an apparatus in which the series production of moulded articles is not hampered by having to wait for the cooling of moulds, since the latter can be emptied or removed at any convenient time whilst the filling of other moulds is proceeding.

It will be understood that the rotary mould table arrangements described in the previous examples may be used in conjunction with any of the injection cylinder arrangements described and claimed in my copending patent application, Serial No. 593,282, relating to apparatus for moulding plastic materials. Also if desired the depth of thread of the screw is shallower at the forward end and decreases progressively. This consists in the feeding and plasticizing of the material.

Apparatus according to the invention is adapted for the moulding of suitable injection mouldable rubber, rubble-like, or organic plastic material, especially a polyvinyl plastic such as plasticized polyvinyl chloride or the like.

I claim:

1. Apparatus for injection moulding comprising a heated cylinder, a feed screw mounted for rotation within the cylinder for feeding material supplied thereto to the forward end of the cylinder, injection valve means at the forward end of the cylinder to which the material can be fed, said valve means being formed and adapted to be opened by the engagement therewith of a mould to permit injection of material into said mould, a rotatably mounted table, moulds secured to said table in spaced relation with their injection orifices facing outwardly, said table being mounted to confine motion thereof to a fixed plane such that the mould orifices lie in the same plane as the injection valve and successive mould orifices can be aligned with the injection valve means of the cylinder by rotation of the table, said table being mounted for bodily displacement in its plane towards and away from the injection cylinder, and means for effecting such bodily displacement of the table rectilinearly in its plane whereby the injection valve means of the cylinder is brought into engagement with a mould and opened thereby to permit injection of material into the mould.

2. Apparatus according to claim 1, comprising also means for rotating the table, and in which the means for effecting bodily displacement of the table includes a toothed rack on the table co-operating with a pivoted catch having a fixed pivot, and means interconnecting said table rotating and displacement means for effecting the required angular rotation of the table when the latter is displaced away from the injection cylinder on completion of an injection operation.

3. Apparatus according to claim 1, in which the feed screw is held against longitudinal movement relatively to the cylinder so that injection is effected by screw action, and a diffuser head having narrow passages therein is mounted on the forward end of the said feed screw.

References Cited in the file of this patent

UNITED STATES PATENTS

| | | |
|---|---|---|
| 2,333,056 | Thoreson et al. | Oct. 26, 1943 |
| 2,518,594 | Blanchard et al. | Aug. 15, 1950 |
| 2,668,325 | Goodwin | Feb. 9, 1954 |
| 2,734,226 | Willert | Feb. 14, 1956 |

FOREIGN PATENTS

| | | |
|---|---|---|
| 569,155 | Great Britain | May 10, 1945 |